United States Patent [19]

Stark, Jr.

[11] 4,307,213

[45] Dec. 22, 1981

[54] CURABLE EPOXY RESIN COMPOSITIONS

[75] Inventor: Charles J. Stark, Jr., Clifton Park, N.Y.

[73] Assignee: General Electric Company, Schenectady, N.Y.

[21] Appl. No.: 184,482

[22] Filed: Sep. 5, 1980

[51] Int. Cl.³ .......................................... C08G 59/68
[52] U.S. Cl. ................................. 525/507; 525/523; 528/88; 528/92; 528/361; 528/411
[58] Field of Search ................. 525/507, 523; 528/88, 528/92, 361, 411

[56] References Cited

U.S. PATENT DOCUMENTS

| | | | |
|---|---|---|---|
| 2,962,410 | 11/1960 | Kohn et al. | 528/92 X |
| 3,776,978 | 12/1973 | Markovitz | 528/92 X |
| 3,812,214 | 5/1974 | Markovitz | 528/92 |
| 4,085,250 | 4/1978 | Smith | 528/92 X |

*Primary Examiner*—Earl A. Nielsen
*Attorney, Agent, or Firm*—Peter A. Bielinski; James C. Davis, Jr.; Joseph T. Cohen

[57] ABSTRACT

Diesters of catechol and ring substituted catechol exhibit enhanced characteristics as accelerators in the cure of epoxy resins when utilized in combination with a cure initiator, such as an oxygen titanate or zirconate.

39 Claims, No Drawings

CURABLE EPOXY RESIN COMPOSITIONS

This invention is concerned with novel resinous compositions of matter, their preparation and their uses in coating compositions, liquid injection molding compounds, as casting resins for encapsulation of electronic components, pultrusion, laminates, bulk molding compounds (BMC), and in other applications where epoxy resins are normally employed for purposes now well known in the art. More particularly, the invention relates to compositions of matter comprising (1) an epoxy resin comprising a polyether derivative of a polyhydric organic compound or derivatives of glycidyl or nonglycidyl ether epoxides and (2) a titanate or zirconate curing agent or initiator and (3) an accelerator of the general formula

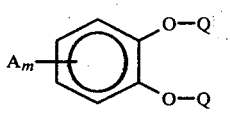

where Q is

and R is independently selected from the class consisting of monovalent alkyl, (including aralkyl), aryl, alkaryl, vinyl, and allyl radicals; A is independently selected from the class consisting of monovalent alkyl, alkoxy, halogen, and nitro radicals, where A can be ortho-, meta, or para- to either oxygen atom. The alkyl radicals, advantageously containing from 1 to 8 carbon atoms, include, for example, methyl, ethyl, benzyl, propyl, isopropyl, butyl, hexyl, 2-ethylhexyl, etc. radicals. The aryl radicals include, for example, phenyl, tolyl, napthyl, etc. radicals; m is an integer from 0 to 2, inclusive.

The cure accelerators corresponding to formula I may be prepared by reacting a phenol of the general formula

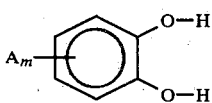

with the required acyl halide, or with an acid anhydride, for example, acetic anhydride to form the diacetate, in the presence of an acid such as concentrated sulfuric acid, or an amine such as pyridine, where A and m have the meanings above. Normally, excess acetic anhydride is employed to insure quantitative conversion to the acetate and as a solvent for the catechol. At least two mols of the acryl halide or anhydride is employed per mol phenol of formula II.

For example, the 4-chlorocatecholdiacetate of formula I is prepared by reacting 4-chlorocatechol and acetic anhydride (on a 1 to 2 molar basis) in the presence of pyridine. Examples of acid anhydrides which may be used to make compounds of formula I are propionic anhydride, benzoic anhydride, butyric anhydride, etc.

In U.S. Pat. No. 2,962,410 (Kohn, et al.) it is disclosed that ethoxyline resins have been cured utilizing an organic titanium ester in combination with a nitrogen containing base such as trimethylamine, dibutylamine, derivatives of amines, for instance, piperidine benzoate, etc.

In U.S. Pat. No. 3,812,214 (Markovitz), it is disclosed that epoxy resins may be cured utilizing a suitable catalytic hardener such as metal acetylacetonates and a phenolic accelerator such as bisphenol-A [i.e., 2-bis(4-hydroxyphenyl)propanet], catechol, resorchinol, etc.

In my previously filed application Ser. No. 168,635, filed July 11, 1980 and assigned to the same assignee as the present invention, I disclosed the use of monoesters of phenols as accelerators. When used as accelerators in otherwise identical formulations, it was shown that phenyl acetates provided faster gel times than the parent phenols from which they were obtained. Surprisingly, the reverse effect was observed when catechol and substituted catechol diacetates were evaluated as accelerators.

The accelerators noted above which are useful in combination with epoxy curing agents to cure both resins have certain limitations. For example, epoxy resins cured with polyamines and polyamides are very reactive and cure very rapidly; however, the cured product normally has poor electrical properties. The utilization of catechols as accelerators in combination with a titanate ester initiator for the cure of epoxy resins has often been at the expense of the storage stability of such mixtures at ambient temperatures. In addition, it has been observed, when compared to the accelerator of the present invention, that phenolic accelerators generally require a higher temperature to cure the epoxy resin and often are present in a greater concentration than that needed to cure an epoxy resin composition utilizing the catecholdiacetate accelerators of the present invention. The test data as shown in the examples given below verify that the cure rate of epoxy resins can be varied over a wide temperature and time range depending on the type of curing initiator and aryl ester accelerator employed.

It is an object of the present invention to provide a thermosetting epoxy resin composition, the reactivity of which can be controlled over a wide range, i.e., from almost instantaneous cure to controlled cure rates coupled with the ability to cure rapidly at elevated temperatures.

It is an additional object of this invention to provide epoxy resin compositions containing cure accelerators which impart desirable physical properties, including favorable chemical resistance and electrical properties in the resultant heat-cured epoxy resin.

The term "epoxy resins" is intended to include those selected from both glycidyl and non-glycidyl ether epoxides containing more than one 1,2-epoxy group per molecule.

Such non-glycidyl ether cycloaliphatic epoxides are characterized by the absence of the ether oxygen bond, i.e. —O—, near the epoxide group, and are selected from those which contain a ring structure as well as more than one epoxide group in the molecule. The epoxide group may be part of the ring structure or may be attached to the ring structure. These epoxides may also contain ester linkages. These ester linkages are generally not near the epoxide group and are relatively unreactive, therefore these type materials are properly characterized as cycloaliphatic epoxides. These epoxides are generally prepared by epoxidizing unsaturated aliphatic hydrocarbon compounds, such as cyclic-olefins, using hydrogen peroxide or peracids such as peracetic acid and perbenzoid acid.

Other epoxy resins which may be employed in this invention such as 1,2-epoxy resins having more than one epoxy group per molecule include cycloaliphatic epoxy resins such as 3,4-epoxycyclohexylmethyl-(3,4-epoxy) cyclohexane carboxylate (sold under the trademarks ERL 4221 by Union Carbide Co. or Araldite CY 179 by Ciba Products Company), bis(3,4-epoxy 6-methylcyclohexylmethyl) adipate (sold under the trademarks ERL 4289 by Union Carbide Co. or Araldite CY 178 by Ciba Products Company), vinylcyclohexane dioxide (ERL 4206 made by Union Carbide Company), bis(2,3-epoxycyclopentyl) ether resins (sold under the trademark ERL 4205 by Union Carbide Company), 2-(3,4-epoxy)-cyclohexyl-5, and 5-spiro (3,4-epoxy)-cyclohexane-m-dioxane, (sold under the trademark Araldite CY 175 by Ciba Products Company), etc.

Glycidyl ether based epoxy resins suitable for use according to the present invention include glycidyl ethers of phenolic resins such as liquid or solid bis-phenol-A, diglycidyl ether epoxy resins (such as those sold under trademarks as Epon 826, Epon 828, Epon 820, Epon 1001, Epon 1002, Epon 1004, etc., by Shell Chemical Company), phenol-formaldehyde novolac polyglycidyl ether epoxy resins (such as those sold under the trademarks DEN 431, DEN 438, and DEN 439 by Dow Chemical Company), epoxy cresol novolacs (such a those sold under trademarks ECN 1235, ECN 1273, ECN 1280 and ECN 1299 by Ciba Products Company), resorcinol glycidyl ethers (such as ERE 1359 made by Ciba Products Company), tetra-glycidyl tetraphenylethane (Epon 1031, made by Shell Chemical Company); glycidyl ether epoxy resins such as diglycidyl phthalate (ED5661 by Celanese Resins Company), diglycidyl tetrahyrophthatlate (Araldite CY 182 by Ciba Products Company), and diglycidyl hexahydrophthalate (Araldite CY 183 made by Ciba Products Company); the flame retardant epoxy resins such as halogen-containing bisphenol-A diglycidyl ether epoxy resins (e.g., DER 542 and DER 511 which have bromine contents 44–48 and 18–20%, respectively, and are made by Dow Chemical Company).

The foregoing epoxy resins are well known in the art and are set forth, for example, in many patents including U.S. Pat. Nos. 2,324,483, 2,444,333, 2,494,295, 2,500,600, and 2,511,912. The combined stabilizers and curing agents used in the practice of this invention are not only effective with various epoxy resins and mixtures of epoxy resins, but they are also effective in mixtures containing reactive and nonreactive epoxy diluents (or extenders), epoxy flexibilizers and fillers.

The curing rate of epoxy resin compositions can be tailored to cure over a time span of from five minutes to several hours based on the resin or resin mixture selected, the amount and type of curing agent and accelerator utilized in relation to the cure temperature chosen, etc. Further blends of epoxy resins such as ERL 4221 epoxy resin/ECN 1235 epoxy cresol novolar resin, or glycidyl ether and glycidyl ester epoxy resins may be cured using the accelerators of the present invention.

The organic titanate initiators, which are added to the epoxy resin composition to initiate the cure of the epoxy resins include glycolate titanates (e.g., tetraoctylene glycol titanate containing approximately 7.8% Ti and sold under the trademark Tyzor OG by E.I. du Pont de Nemours and Company, or di-n-butyl hexylene glycol titanate), nonchelated titanates such as tetraisopropyl titanate (TPT) titanium (di-i-propoxide) bis(2,4-pentanedionate), 75% in i-propanol (Tyzor AA), tetrabutyl titanate, polymerized tetrabutyl titanate, tetrakis (2-ethylhexyl) titanate (TOT), etc. In general, the chosen titanate should be present in a concentration between 0.03 and 15%, by weight, based on the weight of the epoxy resin, with optimum cure rates generally being obtained utilizing titanate concentrations between 1 to 10% by weight, of the epoxy resin. The amount of curing agent used will depend on such factors as type of epoxy resin used, temperature at which cure is to take place, type of curing agent and accelerator used, etc.

In place of organic titanates, organic zirconate curing agents can be added for the curing of epoxy resins, and these include, for example, zirconium acetylacetonate, zirconium-tert-butoxide, zirconium hexafluoroacetylacetonate, zirconium naphthenate (sold by Witco Chemical Company, Incorporated), zirconium propoxide, zirconium isopropoxide (sold by Ventrol Corporation), etc. The amount of zirconate curing agent can be within the same weight range as that of the titanate curing agent.

In order that those skilled in the art may better understand how the present invention may be practiced, the following examples are given by way of illustration and not by way of limitation. All parts are by weight, unless otherwise indicated.

EXAMPLE 1

An accelerator having the formula

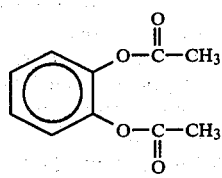

III.

was prepared according to the following procedure. In a reaction vessel fitted with a reflux condenser were introduced 110 parts catechol, 224 parts acetic anhydride, 87 parts toluene and 4.0 parts pyridine. The mixture was heated to reflux for 15 hours at 140° C. under an atmosphere of nitrogen. When the reaction was completed the volatiles were removed by flash evaporation and a mixture of 118 parts methanol and 30 parts water was added to the residue. The residue mixture was then cooled and crystallization occured. The crystals were filtered from the solution, washed with methanol and dried, yeilding 127.2 parts of the accelerator of formula III.

EXAMPLE 2

An accelerator having the formula

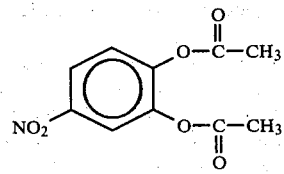

IV.

was prepared according to the following procedure. In a reaction vessel fitted with a reflux condenser were introduced 15 parts 4-nitrocatechol, 25 parts acetic anhydride and 0.89 part pyridine. The mixture was heated to reflux for 15 hours at 140° C. under an atmosphere of nitrogen. When the reaction was completed, the volatiles were removed by flash evaporation and the residue was distilled at 0.5 Torr to yield 11.9 parts of the accelerator of the formula IV, having a melting point of 78° C.

EXAMPLE 3

Tests 1-4 of Table I, provide gel or curing times at 90° C. for compositions utilizing the accelerators described above. In each test, the formulation consists of 100 parts Epon 828, 3.8 parts Tyzor TPT and an accelerator as indicated in Table I.

TABLE I

| Test No. | Accelerator | Parts Accelerator | Gel Time |
|---|---|---|---|
| 1 | p-Cl—$C_6H_4$OH | 6.9 | 43.3 min. |
| 2 | 4-chlorophenylacetate | 9.2 | 12.7 min. |
| 3 | catechol | 3.0 | 0.8 min. |
| 4 | catecholdiacetate | 5.2 | 47.9 min. |
| 5 | catechol | 4.5 | 0.5 min. |
| 6 | catecholdiacetate | 7.9 | 39.4 min. |

EXAMPLE 4

Tests 7-10 of Table II show the gel or curing time and the heat deflection temperature tests of epoxy resin compositions. For the gel time tests, a mixture of 100 parts Epon 828, 1.5 parts Tyzor TPT, and 5.0 parts of an accelerator corresponding to formula III was prepared. The gelation time of this composition was measured with a Sunshine Gel Meter (Sunshine Scientific Instruments Co., Philadelphia, Pa.) at 50° C. and 150° C. To determine the heat deflection temperature (HDT), (tests 9 and 10), an epoxy resin composition comprising 100 parts Epon 828, 3.1 parts Tyzor TOT and 5 parts of an accelerator corresponding to formula III was prepared. The resulting composition was halved and poured into two molds. Each mold was then cured in an oven at 150° C. and 170° C. respectively, for 24 hours. Subsequently, each mold was removed and disassembled. Molded parts were obtained, which were machined to produce samples of 4.75"×0.5"×0.25" for measuring the heat deflection temperature for each sample. The temperatures required to produce a 10 mil deflection under 264 psi were measured and recorded.

TABLE II

| Test No. | T° C. | Gel Time (min) | HDT(°C.) |
|---|---|---|---|
| 7 | 50 | 4329.8(>3 days) | |
| 8 | 150 | 6.1 | |
| 9 | 150 | | 67 |
| 10 | 170 | | 103 |

EXAMPLE 5

For comparison, compositions consisting of 100 parts Epon 828, 1.5 parts Tyzor TPT and an accelerator as disclosed below, were prepared. Tests 11-14 of Table III, provide gel or curing times for these compositions at the temperature indicated.

TABLE III

| Test No. | Accelerator | Parts Accelerator | T° C. | Gel Time (min) |
|---|---|---|---|---|
| 11 | p-Cl—$C_6H_4$OH | 6.9 | 150 | 11.3 |
| 12 | p-Cl—$C_6H_4$OAc | 5.2 | 150 | 11.9 |
| 13 | p-Cl—$C_6H_4$OH | 5.2 | 50 | 627.4 |
| 14 | p-Cl—$C_6H_4$OAc | 6.9 | 50 | 551 |

As can be seen from the results in Tables II and III, a catecholdiacetate-derived formulation provides for a faster gel time than 4-chlorophenol or 4-chlorophenylacetate accelerated systems. Furthermore, a comparison of shelf life stability at 50° C. indicates that a catecholdiacetate-derived formulation exhibits about an eighth-fold increase in storage stability.

EXAMPLE 6

Tests 15-21, of Table IV show gel times and HDT tests for an epoxy resin mixture of 100 parts Epon 328, 3.4 parts Tyzor OG, and 5.2 parts of an accelerator of formula III. The gelation time and HDT tests were conducted according to the procedures disclosed for Tests 7-10 of Table II, but using Tyzor OG and employing a curing temperature as indicated.

TABLE IV

| Test No. | T° C. | Gel Time (min) | HDT(°C.) |
|---|---|---|---|
| 15 | 50 | Approx. 6 weeks | |
| 16 | 130 | 92.0 | |
| 17 | 150 | 34.3 | 56.0 |
| 18 | 160 | 16.3 | |
| 19 | 170 | 9.8 | 104 |
| 20 | 180 | 7.3 | |
| 21 | 190 | 5.5 | |

EXAMPLE 7

Tests 22-23 of Table V show gel time tests conducted for compositions consisting of 100 parts Epon 828, 512 parts of an accelerator of formula III, but substituting 2.6 parts zirconium-2, 4-pentanedionate in place of a titanate curing agent. The gel times, as measured with the Sunshine Gel Meter are shown below at the temperature indicated.

TABLE V

| Test No. | T° C. | Gel Time (min) |
|---|---|---|
| 22 | 50° | >34 days |
| 23 | 150° | 23.5 |

Thus, when catecholdiacetate is used to accelerate the cure of Epon 828 initiated by a zirconate curing agent, a fast cure is obtained at 150° C., while providing for a long shelf life at 50° C.

EXAMPLE 8

Substitution on the ring of catechol diacetate affects the gel time and heat deflection temperatures of epoxy resin compositions containing substituted catechol diacetates. Tests 24-27, of Table VI show gel times and heat deflection temperatures using the same procedure as in Example 4, employing an accelerator in an amount as indicated, 3.4 parts of Tyzor OG and 100 parts of EPON 828.

TABLE VI

| Test No. | Accelerator | Parts Accelerator | T° C. | Gel Time (min) | HDT (°C.) |
|---|---|---|---|---|---|
| 24 | 4-nitro-catecholdiacetate | 6.4 | 50 | 10 days | — |
| 25 | 4-nitro-catecholdiacetate | 6.4 | 150 | 9.8 | 49 |

TABLE VI-continued

| Test No. | Accelerator | Parts Accelerator | T° C. | Gel Time (min) | HDT (°C.) |
| --- | --- | --- | --- | --- | --- |
| 26 | catecholdiacetate | 5.2 | 50 | ~6 weeks | |
| 27 | catecholdiacetate | 5.2 | 150 | 34.3 | 56 |

EXAMPLE 9

A thermosetting epoxy resin composition is prepared by mixing 100 parts Epon 828, with 3.4 parts Tyzor OG and 6.2 parts of an accelerator of the formula

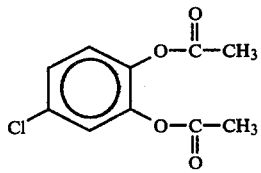
V.

(which can be prepared similarly as the accelerator of Example 2, by reacting 4-chlorocatechol, acetic anhydride and pyridine). When this mixture of ingredients using the accelerator of formula V is tested as in the preceding examples, it will be found that the storage stability of the uncured material is enhanced and the rate of cure at elevated temperatures is accelerated.

EXAMPLE 10

A thermosetting epoxy resin composition was prepared by mixing 100 parts Epon 828, 3.37 parts Tyzor OG and 6.75 parts of an accelerator of the formula

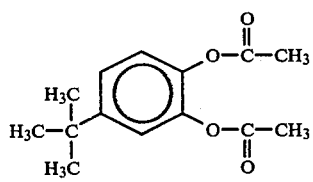
VI.

(prepared similarly as the accelerator of Example 2, by reacting 4-t-butylcatechol, acetic anhydride and pyridine). The gelation time of this composition at 150° C., measured with the Sunshine Gel Meter, was 86.4 minutes.

While other modifications of the invention and variations thereof which may be employed within the scope of the invention have not been described, the invention is intended to include such as may be embraced within the following claims:

What I claim as new and desire to secure by Letters Patent of the United States is:

1. A composition of matter comprising an epoxy resin, a cure initiator, and an accelerator of the general formula

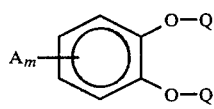

where Q is

and R is independently selected from the class consisting of monovalent alkyl, aryl, alkaryl, aralkyl, vinyl, and allyl radicals; A is independently selected from the class consisting of monovalent alkyl, alkoxy, halogen and nitro radicals, where A can be ortho-, meta-, or para- to either oxygen atom, and m is an integer from 0 to 2, inclusive.

2. A composition of matter as in claim 1 wherein the cure initiator is a titanium or zirconium ester.

3. A composition of matter as in claim 1 where the accelerator has the formula

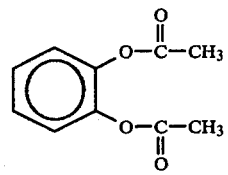

4. A composition of matter as in claim 1 wherein the accelerator has the formula

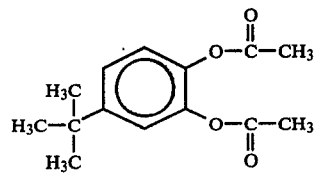

5. A composition of matter as in claim 1 wherein the accelerator has the formula

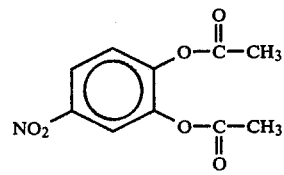

6. A composition of matter as in claim 1 wherein the accelerator has the formula

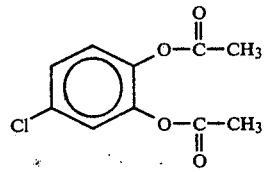

7. A composition of matter as in claim 1 wherein the cure initiator is a zirconium ester and the accelerator has the general formula

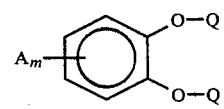

where Q is

and R is independently selected from the class consisting of monovalent alkyl, aryl, alkaryl, aralkyl, vinyl, and allyl radicals; A is independently selected from the class consisting of monovalent alkyl, alkoxy, halogen and nitro radicals where A can be ortho-, meta-, or para- to either oxygen atom, and m is an integer from 0 to 2, inclusive.

8. A composition of matter as in claim 1 wherein the cure initiator is a titanate ester and the accelerator has the general formula

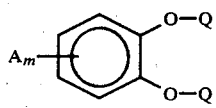

where Q is

and R is independently selected from the class consisting of monovalent, alkyl, aryl, alkaryl, aralkyl, vinyl, and allyl radicals; A is independently selected from the class consisting of monovalent alkyl, alkoxy, halogen and nitro radicals where A can be ortho-, meta-, or para- to either oxygen atom, and m is an integer from 0 to 2, inclusive.

9. A composition of matter as in claim 1 wherein the cure initiator is a zirconium ester and the accelerator has the formula

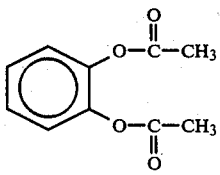

10. A composition of matter as in claim 1 wherein the cure initiator is a zirconium ester and the accelerator has the formula

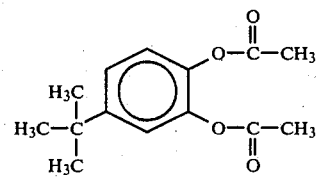

11. A composition of matter as in claim 1 wherein the cure initiator is a zirconium ester and the accelerator has the formula

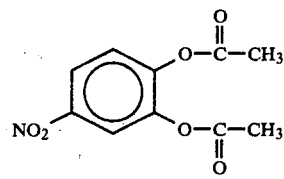

12. A composition of matter as in claim 1 wherein the cure initiator is a zirconium ester and the accelerator has the formula

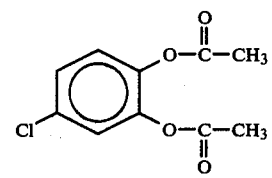

13. A composition of matter as in claim 1 wherein the cure initiator is a titanate ester and the accelerator has the formula

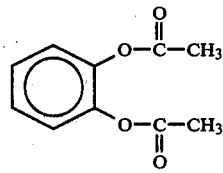

14. A composition of matter as in claim 1 wherein the cure initiator is a titanate ester and the accelerator has the formula

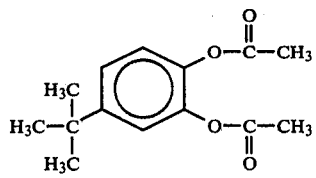

15. A composition of matter as in claim 1 wherein the cure initiator is a titanate ester and the accelerator has the formula

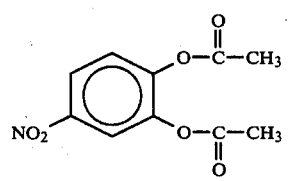

16. A composition of matter as in claim 1 wherein the cure initiator is a titanate ester and the accelerator has the formula

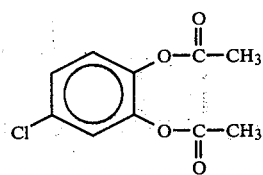

17. A method for curing an epoxy resin which comprises (1) forming a mixture of ingredients comprising an epoxy resin, a cure initiator, and an accelerator of the general formula

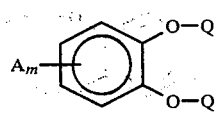

where Q is

and R is independently selected from the class consisting of monovalent alkyl, aryl, alkaryl, aralkyl, vinyl, and allyl radicals; A is independently selected from the class consisting of monovalent alkyl, alkoxy, halogen and nitro radicals, where A can be ortho-, meta-, or para- to either oxygen atom, and m is an integer from 0 to 2, inclusive, (2) heating the aforesaid mixture of ingredients at a temperature and for a time sufficient to effect curing of said epoxy resin.

18. A method for curing an epoxy resin which comprises (1) forming a mixture of ingredients comprising an epoxy resin, a cure initiator, and an accelerator of the formula

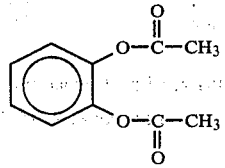

and (2) heating the aforesaid mixture of ingredients at a temperature and for a time sufficient to effect curing of said epoxy resin.

19. A method of curing an epoxy resin which comprises (1) forming a mixture of ingredients comprising an epoxy resin, a cure initiator, and an accelerator of the formula

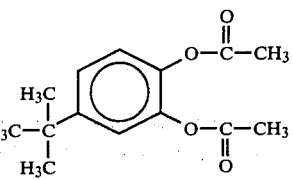

and (2) heating the aforesaid mixture of ingredients at a temperature and for a time sufficient to effect curing of said epoxy resin.

20. A method for curing an epoxy resin which comprises (1) forming a mixture of ingredients comprising an epoxy resin, a cure initiator, and an accelerator of the formula

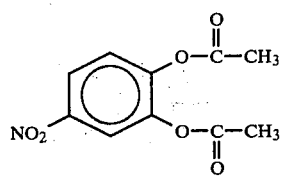

and (2) heating the aforesaid mixture of ingredients at a temperature and for a time sufficient to effect curing to said epoxy resin.

21. A method for curing an epoxy resin which comprises (1) forming a mixture of ingredients comprising an epoxy resin, a cure initiator, and an accelerator of the formula

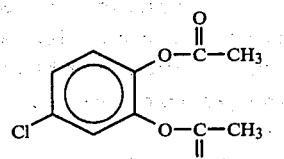

and (2) heating the aforesaid mixture of ingredients at a temperature and for a time sufficient to effect curing of said epoxy resin.

22. A method for curing an epoxy resin according to claim 17, wherein the cure initiator is a titanium ester.

23. A method for curing an epoxy resin according to claim 17, wherein the cure initiator is a zirconium ester.

24. The heat cured composition of claim 1.
25. The heat cured composition of claim 2.
26. The heat cured composition of claim 3.
27. The heat cured composition of claim 4.
28. The heat cured composition of claim 5.
29. The heat cured composition of claim 6.
30. The heat cured composition of claim 7.
31. The heat cured composition of claim 8.
32. The heat cured composition of claim 9.
33. The heat cured composition of claim 10.
34. The heat cured composition of claim 11.
35. The heat cured composition of claim 12.
36. The heat cured composition of claim 13.
37. The heat cured composition of claim 14.
38. The heat cured composition of claim 15.
39. The heat cured composition of claim 16.

* * * * *